(12) United States Patent
Jansma et al.

(10) Patent No.: US 8,427,007 B2
(45) Date of Patent: Apr. 23, 2013

(54) FIELD REPLACEABLE MANAGEMENT MODULE

(75) Inventors: Michael Jansma, Eureka, MO (US); Jeffrey Stuart Jones, St. Charles, MO (US); Joseph Thomas Kramer, Ballwin, MO (US)

(73) Assignee: Schneider Electric IT Corporation, West Kingston, RI (US)

( * ) Notice: Subject to any disclaimer, the term of this patent is extended or adjusted under 35 U.S.C. 154(b) by 383 days.

(21) Appl. No.: 12/711,738

(22) Filed: Feb. 24, 2010

(65) Prior Publication Data

US 2011/0205693 A1 Aug. 25, 2011

(51) Int. Cl.
*H02J 3/38* (2006.01)
(52) U.S. Cl.
USPC .......................................................... 307/19
(58) Field of Classification Search ...................... 307/19
See application file for complete search history.

(56) References Cited

U.S. PATENT DOCUMENTS

| 7,141,891 | B2 | 11/2006 | McNally et al. | |
|---|---|---|---|---|
| 7,171,461 | B2 * | 1/2007 | Ewing et al. | 709/223 |
| 7,999,415 | B2 * | 8/2011 | Beckman | 307/126 |
| 2009/0207034 | A1 * | 8/2009 | Tinaphong et al. | 340/635 |
| 2009/0284250 | A1 * | 11/2009 | Rittmann | 324/130 |

OTHER PUBLICATIONS

APC, "Print Technical Specifications: AP7950," downloaded on Feb. 2, 2010 from www.apc.com.
APC, "Metered Rack PDU," downloaded on Feb. 2, 2010 from www.apc.com.
APC, "Installation Metered Rack Power Distribution Unit," downloaded on Feb. 2, 2010 from www.apc.com.

\* cited by examiner

*Primary Examiner* — Robert L. Deberadinis
(74) *Attorney, Agent, or Firm* — Lando & Anastasi LLP

(57) ABSTRACT

Aspects of the invention are directed to a power distribution unit including a removable management module and methods for providing power using the power distribution units. According to one embodiment the power distribution unit comprises a housing having a length, a width and a depth with a front face of the housing extending across the width and along the length with the length being substantially greater than the width and the depth, and wherein the front face of the housing defines an opening to a docking space in an interior portion of the housing, a plurality of power outlets disposed on the front face of the housing, a management module configured to detect current through at least one of the plurality of power outlets, the management module being further configured and arranged to fit within the docking space, a memory component contained within the housing and configured to store operational data for the power distribution unit, and wherein the management module and the housing are configured and arranged such that the management module is removable from the docking space through the opening in the front face.

20 Claims, 7 Drawing Sheets

FIELD REPLACEABLE MANAGEMENT MODULE

BACKGROUND

1. Field of the Invention

The present disclosure is directed to power distribution units (PDU) having a small physical profile, and more specifically to small profile PDU products which include removable management modules.

2. Related Art

Equipment racks are typically used to house server and networking components in data centers. The number of components and the complexity of the data centers varies based on specific requirements of an individual site.

In addition to the server and network components, power distribution and power supply components including power distribution units (PDUs) for providing power to the components are typically installed in equipment racks. Conventional equipment racks are designed to optimize space utilization, provide for cooling of the various components all while balancing the need for servicing the various installed elements and even the racks themselves. Standards such as the Electronics Industry Association (EIA) RS-310 19" rack standard have been developed to standardize the height and width of electronic rack systems to facilitate effective use of space within equipment racks. The vertical space within a rack system is generally defined in vertical mounting unit increments, often referred to as "U's." A mounting unit or U is typically 1.75 inches. Interior rails of rack systems often have three mounting slots selectively spaced within each U of vertical space for attaching components. Rack systems and components are typically sized in mounting unit increments. For example, "2U" components are sized to fit within a 2U vertical space; "48U" and "72U" racks are sized to have 48U and 72U, respectively, of usable vertical mounting space.

Power distribution units can be installed in the mounting space of a rack, and in addition, "Zero U" PDUs can be installed in the rear of an equipment rack, outside of the mounting space. Conventionally, Zero U PDUs may be difficult to service based on the concentration of components and associated cabling in a rack.

Frequently, a malfunctioning PDU must be removed from a rack and the entire unit replaced. The need to replace the entire PDU, can result in significant down time for rack components. High availability components may need to be powered down for such replacement, and power connections may need to be removed and reconnected to a newly installed PDU. In some PDUs, upwards of 40 outlets are connected in a given PDU installation. A full replacement necessitates that each connection be removed, the PDU uninstalled, a replacement installed, all of the connections re-established, and any site specific settings and configuration data must be re-established for the newly installed unit.

SUMMARY

According to one embodiment, a power distribution unit having a small physical profile with a modular management component is provided. The small physical profile is ideally suited to typical rack environments, as the small physical profile permits installation of the PDU in the rack using little or no mounting space. As the mounting space in a rack comes at a premium, any savings with respect to mounting space is typically regarded as beneficial.

In designing conventional small profile PDUs, ease of maintenance has been sacrificed in order to provide the small physical profile. According to one aspect, a power distribution unit is constructed and arranged with a removable management module that permits field maintenance of installed PDUs. Field maintenance refers to the ability to service individual components of the PDU without effecting a complete replacement.

In one embodiment, the PDU is configured to permit hot-swapping of a management module, thereby reducing any system downtime and preserving availability of connected components. In other embodiments, the PDU must be powered down to replace the management module. In some examples, a memory component is constructed and arranged to be separate and/or separable from the management module. In one example, PDU system settings can be retained on memory components that are not removed during service of a management module. In another example, a memory component is removed from a serviced management module and installed on a replacement management module.

According to one aspect of the present invention, a power distribution unit comprises a housing having a length, a width and a depth with a front face of the housing extending across the width and along the length with the length being substantially greater than the width and the depth, and wherein the front face of the housing defines an opening to a docking space in an interior portion of the housing, a plurality of power outlets disposed on the front face of the housing, a management module configured to detect current through at least one of the plurality of power outlets, the management module being further configured and arranged to fit within the docking space, a memory component contained within the housing and configured to store operational data for the power distribution unit, wherein the management module and the housing are configured and arranged such that the management module is removable from the docking space through the opening in the front face. According to one embodiment of the present invention, the memory component is mounted in the interior portion of the housing separate from the management module. According to another embodiment of the invention, the communications circuitry is configured to communicate with an external communications network. According to another embodiment of the invention, the communications circuitry is configured for wireless communication with the external communications network.

According to one embodiment of the present invention, the management module further comprises a display. According to another embodiment of the invention, the power distribution unit further comprises at least one cable having a connector for electrically coupling the management module to circuitry contained with the interior portion of the housing. According to another embodiment of the invention, the power distribution unit further comprises a power input and circuitry configured to distribute input power at the power input to each of the plurality of power outlets. According to another embodiment of the invention, the power distribution unit is configured to operate in a maintenance mode and provide power at the power input to each of the plurality of power outlets with the management module decoupled from the power distribution unit. According to another embodiment of the invention, the power distribution unit further comprises at least one current sensor coupled to the management module, and wherein the memory includes calibration data associated with the at least one current sensor. According to another embodiment of the invention, the management module has a front face that is substantially flush with the front face of the housing with the management module installed in the docking space. According to another embodiment of the invention, the memory component is separable from the management module. According to another embodiment of the invention, the management module is configured to manage current through at least one of the plurality of power outlets According to one aspect of the present invention, a power distribution method for providing power to a plurality of devices installed in an equipment rack is provided. The method comprises installing a power distribution unit within the equipment rack, the power distribution unit including a power input; a plurality of power outlets, a memory device and a removable management module configured to monitor current through at least one of the plurality of power outlets, wherein the memory device includes calibration data for use by the management module to monitor the current, coupling a power source to the power input, coupling the plurality of power outlets to the plurality of devices to provide power to the plurality of devices, with the power distribution unit installed within the equipment rack, removing the management module from the power distribution unit. According to one embodiment of the present invention, the power distribution method further comprises continuing to provide power to the plurality of devices from the power distribution unit with the management module removed.

According to one embodiment of the present invention, the power distribution method further comprises installing a replacement management module in the power distribution unit. According to another embodiment of the invention, the power distribution method further comprises monitoring the current through the at least one of the plurality of power outlets using the replacement management module and the calibration data in the memory device. According to another embodiment of the invention, the equipment rack has a bottom and a top, wherein the power distribution unit has a length, a width and a depth with a front face of the power distribution unit extending across the width and along the length with the length being substantially greater than the width and the depth, and wherein installing the power distribution unit in the equipment rack includes vertically mounting the power distribution unit in a rear portion of the equipment rack such that the length of the power distribution unit extends in a direction from the bottom of the equipment rack to the top of the equipment rack.

According to one embodiment of the present invention, the removable management module includes a display, and wherein the method further includes displaying information on the display related to power usage of at least one of the plurality of devices. According to another embodiment of the invention, the replacement management module is configured to provide additional functionality. According to another embodiment of the invention, the power distribution method further comprises managing the current through the at least one of the plurality of power outlets using the replacement management module and the calibration data in the memory device. According to another embodiment of the invention, the power distribution method further comprises restoring system settings for the power distribution unit to the replacement management module from the memory device. According to another embodiment of the invention, the power distribution method further comprises connecting the removable management module to a communications network. According to another embodiment of the invention, the power distribution method further comprises receiving remote management messages communicated over the communications network.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
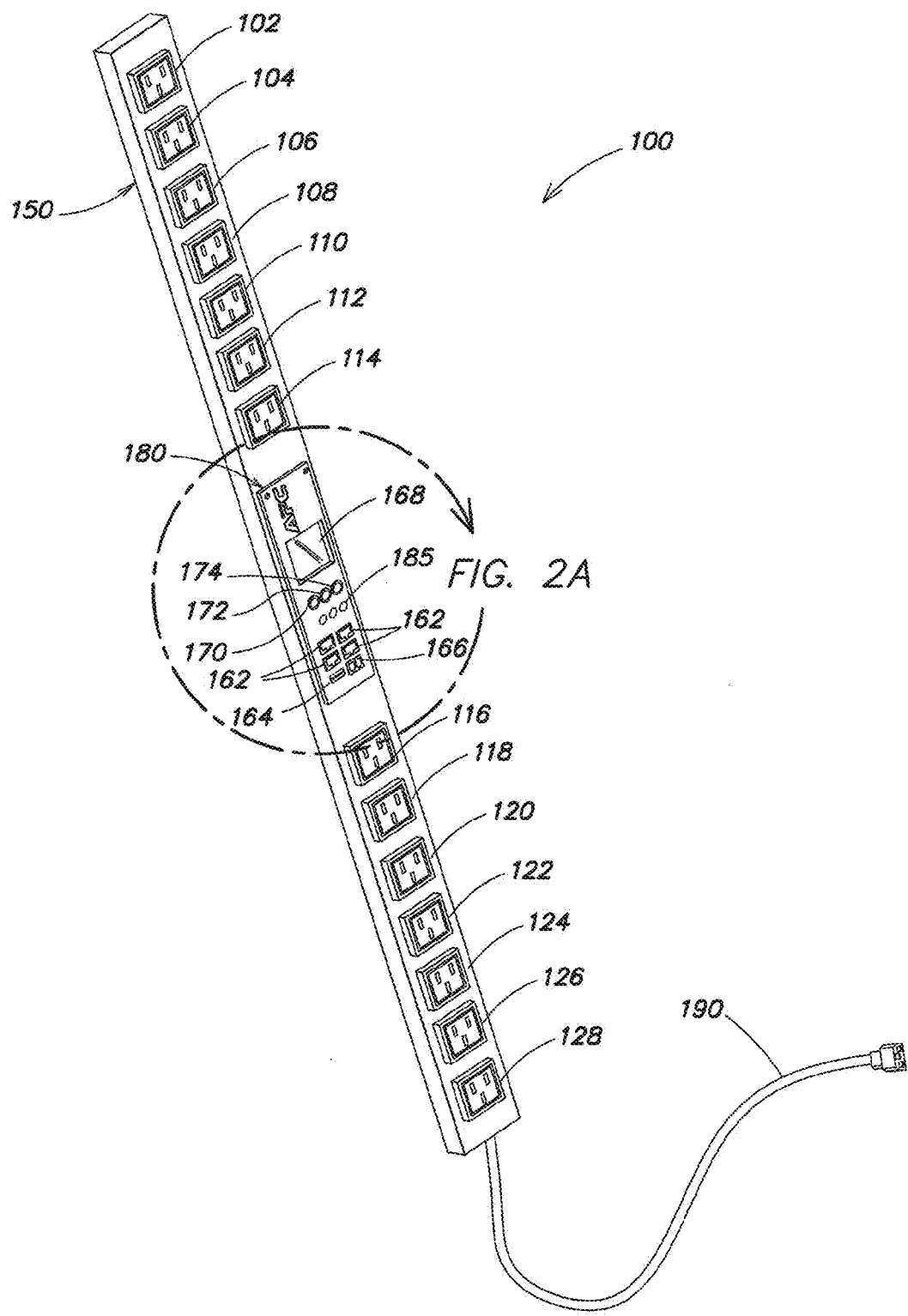
FIG. 1 illustrates one example of a power distribution unit according to various aspects of the present invention.

Embodiments of the invention are not limited in its application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

At least some examples described herein relate to PDUs having small physical profiles that can be used and/or installed in conventional rack mount environments for power distribution while optimizing available rack mounting space. In typical, conventional Zero U PDUs a complete replacement of the PDU is required if any element of the PDU fails. Of all internal components in a typical rack PDU, the network management device and the interface/display circuitry are the most complex and have the highest probability of failure, and when failure occurs, the entire PDU is replaced.

According to some aspects, PDUs include removable management modules and present significant advantages in rack environments. Removable management modules permit field servicing of low and zero profile PDUs. In some examples, PDUs can be constructed and arranged so that management modules are "hot swappable." For PDUs that provide power metering, for example, power distribution wiring can be routed independent of the management module, so that power distribution can still occur (without metering) with a management module removed.

In some examples, remote monitoring of a PDU provides an operator with notification of a failed management module. The capability of communicating with devices powered by a particular PDU, coupled with the inability to communicate with the PDU itself, would suggest a failure of a management component.

In at least one embodiment, the PDU is configured with a separate memory component from the management module. The separate memory component provides the capability to restore PDU system settings without any manual or automated configuration in the field upon installation of a new management module. In some embodiments, the separate memory component is a redundant element connected to a main body of the PDU. The system settings stored in memory can include calibrations and user preferences. In some embodiments, system settings can also include definitions for alarm/warning conditions, alarm warning thresholds, and unit ip address(es), firmware revision, authentication information, model number, outlet configuration, input configuration, product rating, default alarms & thresholds among other options.

Shown in FIG. 1, is an example power distribution unit (PDU) 100 with a removable management module, suitable for installation in a rack enclosure. PDU 100 is constructed and arranged to have a low profile. The PDU includes a housing 150, 8 power outlets 102-128 mounted on a front face of the housing, a power management module 160 and an input power cord 190.

In one embodiment, the housing 150 is constructed of steel or aluminum, although other materials could be used, such as plastic. Some example housings include dimensions of: a maximum height 63.75 inches; a maximum width 2.19 inches; and a maximum depth 1.73 inches. In other embodiments, the housing is constructed with a width of 1.75 to 3 inches, with further examples constructed with widths of up to 4.5 inches. In some implementations, the housing is constructed with a length of 30 to 74 inches, which can vary further depending on an amount of installation space. The housing 150 has openings to receive each of the power outlets and an opening to receive the management module 160. Internal to the housing (not shown) is power distribution circuitry to route input power from the input power cord to each of the power outlets. The power distribution circuitry may include one or more power sensors used to determine current and or voltage provided at each power outlet. PDUs of low physical profile present significant advantages in typical rack installations, as the low profile PDUs can be installed while preserving all of the available rack mount space for system components and/or cooling systems, as may be necessary. Typically, low profile PDUs are constructed and arranged to have a depth that is based upon the particular outlet type used in the PDU. The housing, 150, of the PDU, is constructed in some embodiments to have a depth of less than 2 inches. Although other depths are contemplated with respect to low profile PDUs, and for example, can include PDUs constructed with depths of four inches.

In the embodiment shown in FIG. 1 the outlets 102-128 are implemented using C13/C14 type connectors according to International Standard IEC-320. In other embodiments, other style connectors may be used, and in some embodiments, the connectors can be homogenous, in other embodiments the connector types may vary and include various and/or multiple combinations of connectors. Some example connectors include C1/C2, C3/C4, C5/C6, C7/C8, C9/C10, C11/C12, C15/C16, C15A/C16A, C17/C18, C19/C20, and C21/C22 as described by IEC-320. Other example connectors include IEC 60320 C19, C13, NEMA 5-15R, 5-20R, L5-30R, and L5-20R. Other regionally used receptacles can be incorporated (e.g. European Schuko type, China specific plug, Australia specific plug, etc.) Additional teachings regarding outlet configuration and construction, which may be used in embodiments, is disclosed in commonly owned, co-pending U.S. patent application Ser. No. 12/569,254, entitled "DUAL COLUMN GANG OUTLETS FOR MINIMIZING INSTALLATION SPACE, filed on Sep. 9, 2009, which is incorporated herein by reference in its entirety.

The removable management module 160 is configured to monitor and report on the electric load provided by outlets 102-128. The management module 160 includes a frame 180, a display 168, interface buttons 170-174, ports at 162-166 (which can include a USB port, an Ethernet port, a CAN port, a port for temperature/humidity, and a legacy serial port). The management module 160 can also include specialized hardware (not shown) for controlling operation of the display 168, the interface buttons 170-174, and the port 162-166. The specialized hardware may comprise an ASIC or general purpose computing platform described in greater detail below. Frame 180 secures the external (e.g. display 168, interface buttons 170-174 and ports 162-166) and internal components (e.g. a management module ASIC, analog/digital converter circuitry, and/or processor and interconnections—not shown) of the management module 160. In some embodiments, the management module 160 can include a status display LED 185. In one example, a Red/Green bi-color LED is provided. Green indicates normal operation and Red or Yellow (or Orange) indicates Alarm/Warning condition that is detailed on the LCD display.

Typically, display 168 is an LCD display that displays PDU data (power, configuration, operating data, etc.). In some embodiments the LCD display comprises a monochrome LCD display. The interface buttons 170-174 permit an operator to interact with information and user interfaces shown in display 168. For example, the interface buttons 170-174 can provide navigation functions, including reset, "Main Menu" selection, menu scroll, and menu select operations. According to another embodiment, the display 168 reports on voltage, current, power, temperature/humidity, alarms/warnings, network address, serial number, SKU number, firmware revision. Additional information can be available through the display 168.

An operator can use the interface buttons 170-174 to navigate within the user interface displayed on the display 168. Further, the user interface is configured to permit an operator to interact with the management module. For example, an operator can use the interface to enter settings for the PDU, configure communication settings, access collected information, and change displayed information, as examples.

The ports 162-166 can be used for establishing wired connection(s), for example, to a communication network. In some embodiments, a wireless communication device can be used in place of a wired communication device, potentially eliminating the need for the wired communication ports (e.g. at 162). The USB port 164 is used to connect standard USB devices to the PDU. Flash drives, thumb drives and other USB compatible devices can be connected to the PDU 100 through the USB port 164. The USB device can be employed to capture information from the PDU, copy PDU settings, and/or can be used to configure an installed PDU. The port 166 is a serial connection which can be used to communicate with legacy devices.

Figure 2A:
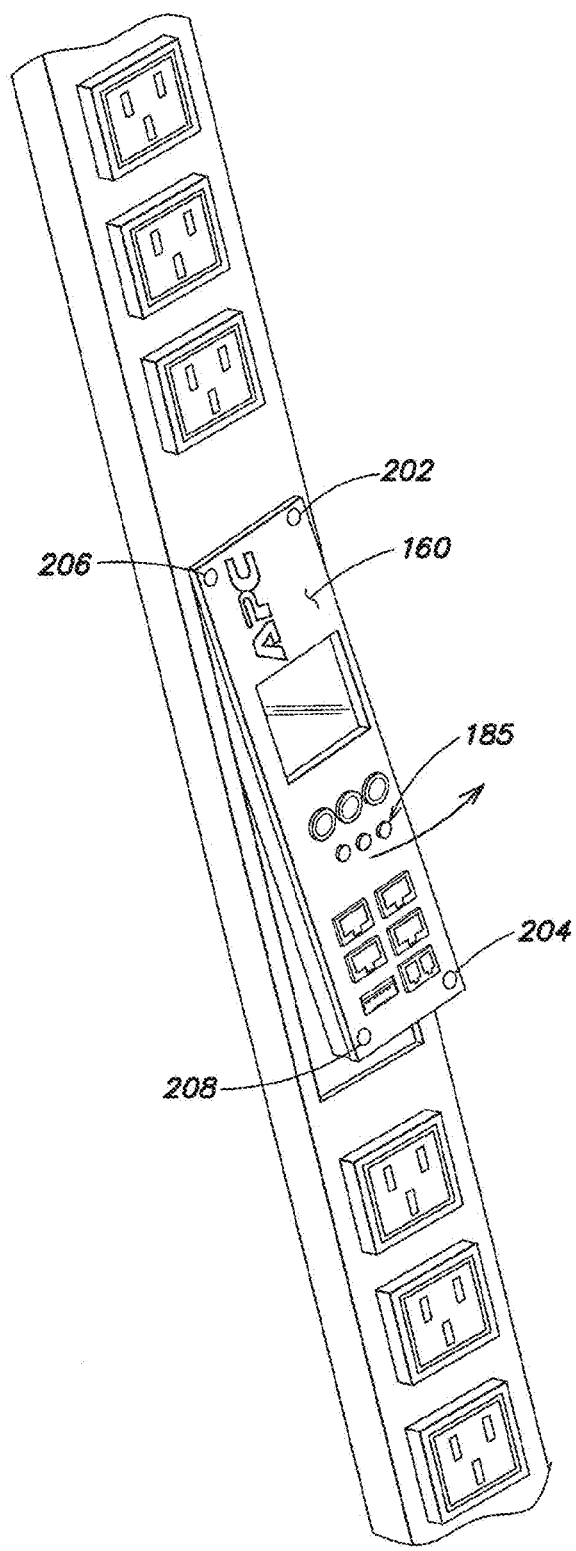
FIGS. 2A-C illustrates removal of a management module from the power distribution unit of FIG. 1, according to various aspects of the present invention.

FIG. 2A illustrates the management module 160 being removed from the PDU 100. Management module 160 can include fasteners to secure the management module to the front face of the PDU using apertures 202-208. In one embodiment, the fasteners can be implemented using screws, while in other embodiments, tool-less fasteners can be employed. In some embodiments, the management module can be secured to the body of the PDU using fasteners along opposing sides of the PDU, rather than on the face of the PDU.

Figure 2B:
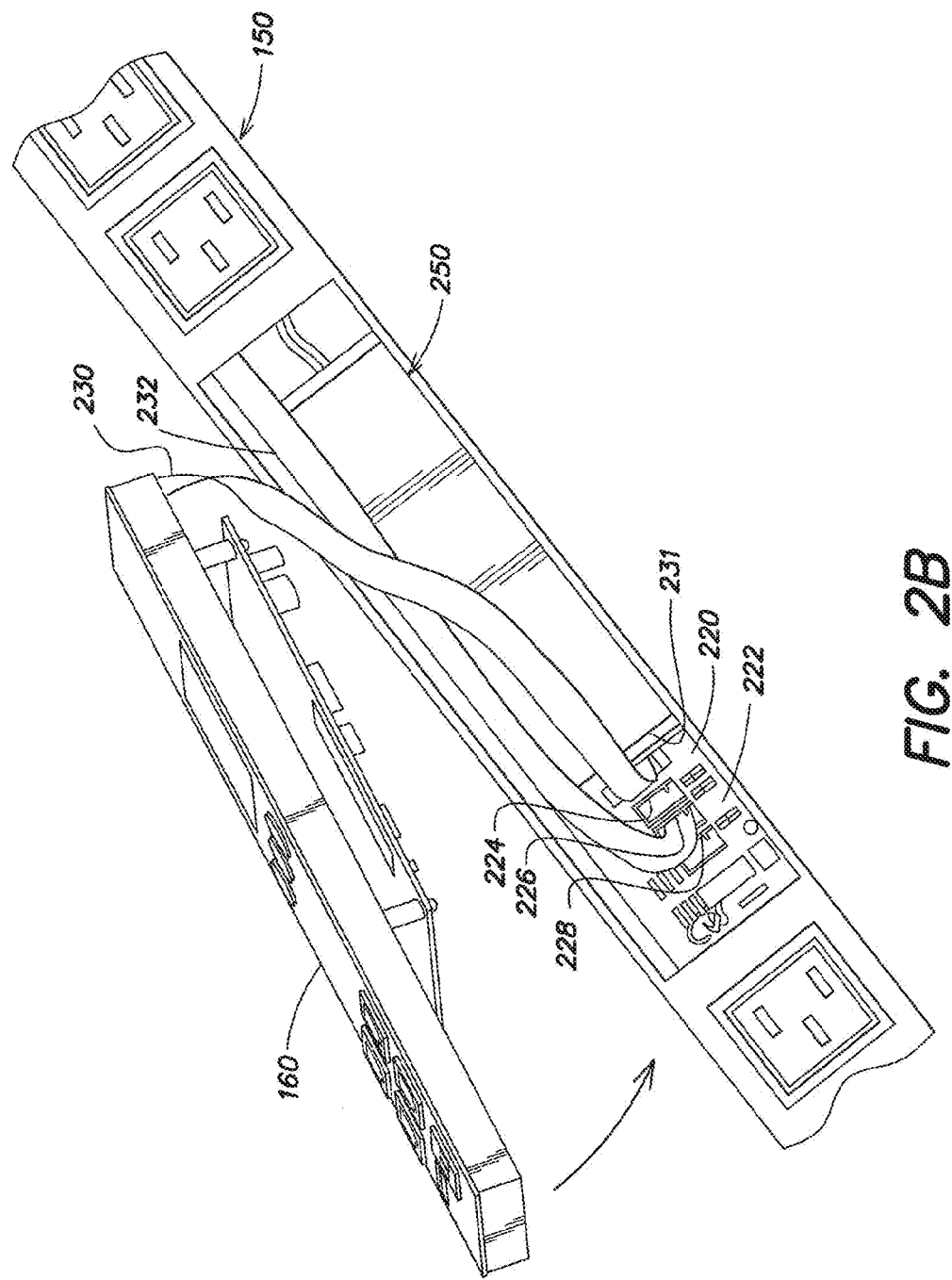

FIG. 2B shows the management module 160 removed from the housing 150, of the PDU 100. The management module is connected to a printed circuit board (PCB) and motherboard, motherboard assembly 220 attached to the housing 150 of the PDU. In this embodiment, the management module is operatively connected to the motherboard assembly 220 via a cable 230 having a positive locking connector (231, see also FIG. 2C) connected to the mother board assembly 220. In one embodiment, the connector is a Blind Mate connector permitting blind mating with management module 160. Cable 230 permits communication between the components of the management module 160 and the motherboard assembly 220, and in additional can be used to provide power to the management module 160.

According to one embodiment, motherboard assembly 220 includes a motherboard 222 and connections 224-228 for connecting the motherboard to at least one relay board and a power supply board (not shown), for example through cable 232. According to one embodiment, the connections 224-228 are configured to lock a connector in place. The connected boards can include a communications board, a power supply board, a current sensor PCB for monitoring power, and a switched relay PCB for providing outlet by outlet control. More than one switched relay PCB may be required based upon outlet configuration. In some embodiments, multiple relay PCBs provide outlet by outlet control. Shown in FIG. 2B, is a connection to the motherboard 222 by a cable (e.g. 232). In other embodiments, the motherboard 222 can employ other connectors and connections to connect any board, for example a relay board, a power supply board, and/or a communication board. The motherboard 222 and/or the motherboard assembly 220 can be constructed with a memory component. In one example, the motherboard assembly 220 includes an EEPROM integrated circuit memory (not shown) for storing system settings. In another example, the motherboard 222 includes an EEPROM integrated circuit memory for storing system settings. System settings include for example, system calibration and configuration data.

According to another embodiment, the motherboard assembly 220, is configured to supply power to the management module and its components. For example, the motherboard assembly can supply DC power for powering monitoring circuitry, port circuitry, communication components, etc. Further the motherboard assembly 220 can be configured to permit power flow to the plurality of outlets of the PDU when the management module is disconnected. In other embodiments, a given PDU can require a management module to supply power to the plurality of outlets. For example, in one embodiment, the PDU is a switched PDU that includes switches to control output power on an outlet by outlet basis. According to one example, in a default state, the circuit for a switched PDU outlet is open, and absent the management module supplying the signal to close the circuit, power cannot be supplied. In another embodiment, the motherboard assembly 220 is further configured to provide a control signal to the switched outlets permit power to be supplied to the connected devices during removal of the management module. Further embodiments of a PDU can be constructed with a motherboard assembly 220 that provides functions to preserve the state (e.g. open or closed) of the PDU's outlets during removal of the management module 160.

The management module 160 in conjunction with circuits and components contained on the motherboard assembly 220 define a processing assembly that permits remote management and monitoring of the PDU. In some embodiments, the logic and/or functions for performing monitoring and/or management functions can be stored on one or the other or a combination of both the management module 160 and the motherboard assembly 220.

As discussed with respect to certain embodiments, a cable is used to connect the management module to circuitry contained with the PDU. In other embodiments, blind docking connectors or other interlocking connections may be used to removably couple the management module to the circuitry. In another example, a PDU is constructed with a connector configured to release ground connections between the management module 160 and the motherboard assembly 220 last during removal of the management module.

Figure 2C:
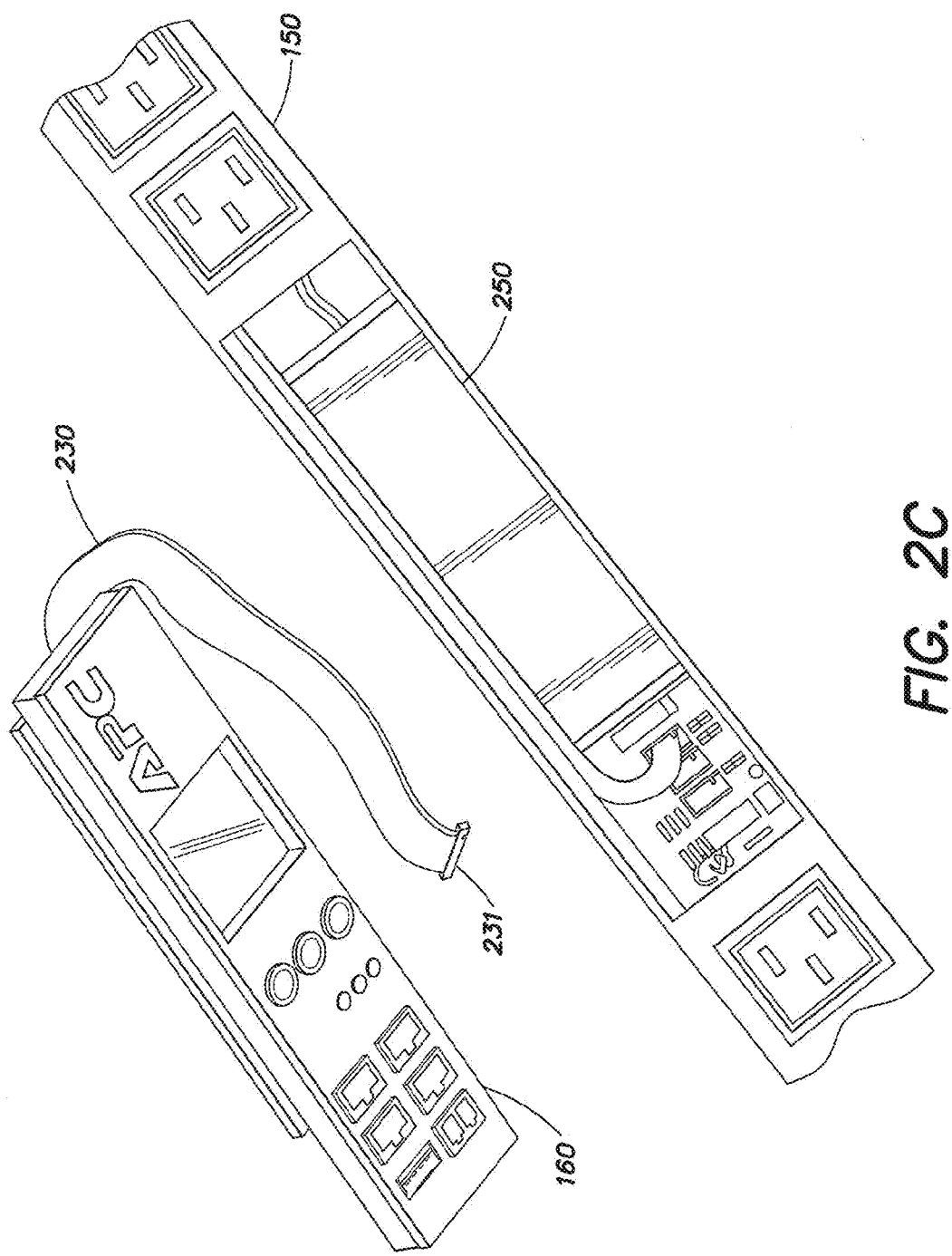

In FIG. 2C, the management module 160 is shown removed from the housing 150 of the PDU with the cable 230 disconnected. As shown in FIG. 2C, a docking space 250 is formed in the housing 150 for receiving the management module 160. A replacement management module can now be installed by connecting the cable 230 of the new management module to the motherboard assembly and inserting the new management module into the docking space, 250. Further, upon making the connection between the motherboard assembly 220 and the management module, the management module can be configured to retrieve any system settings for the PDU. For example, calibration information stored on a memory component of the motherboard assembly 220 can be retrieved. In some examples, an operator is required to initiate the retrieval of system settings. Typically, the operator powers on the management module once the management module has been secured.

For embodiments of PDUs configured to permit hot swapping, an installed PDU, remains connected to the power cords of various component installed in a rack enclosure during the removal and replacement of the management module, without interruption to the power supplied to the various components. For embodiments of PDUs that are not hot-swappable, significant reduction in maintenance is achieved by permitting field replacement of the management module. For example, none of the connected devices need to be removed from the PDU, the body of the PDU does not need to be disconnected from the rack, and any configurations for the PDU are restored during a power up operation.

Figure 3:
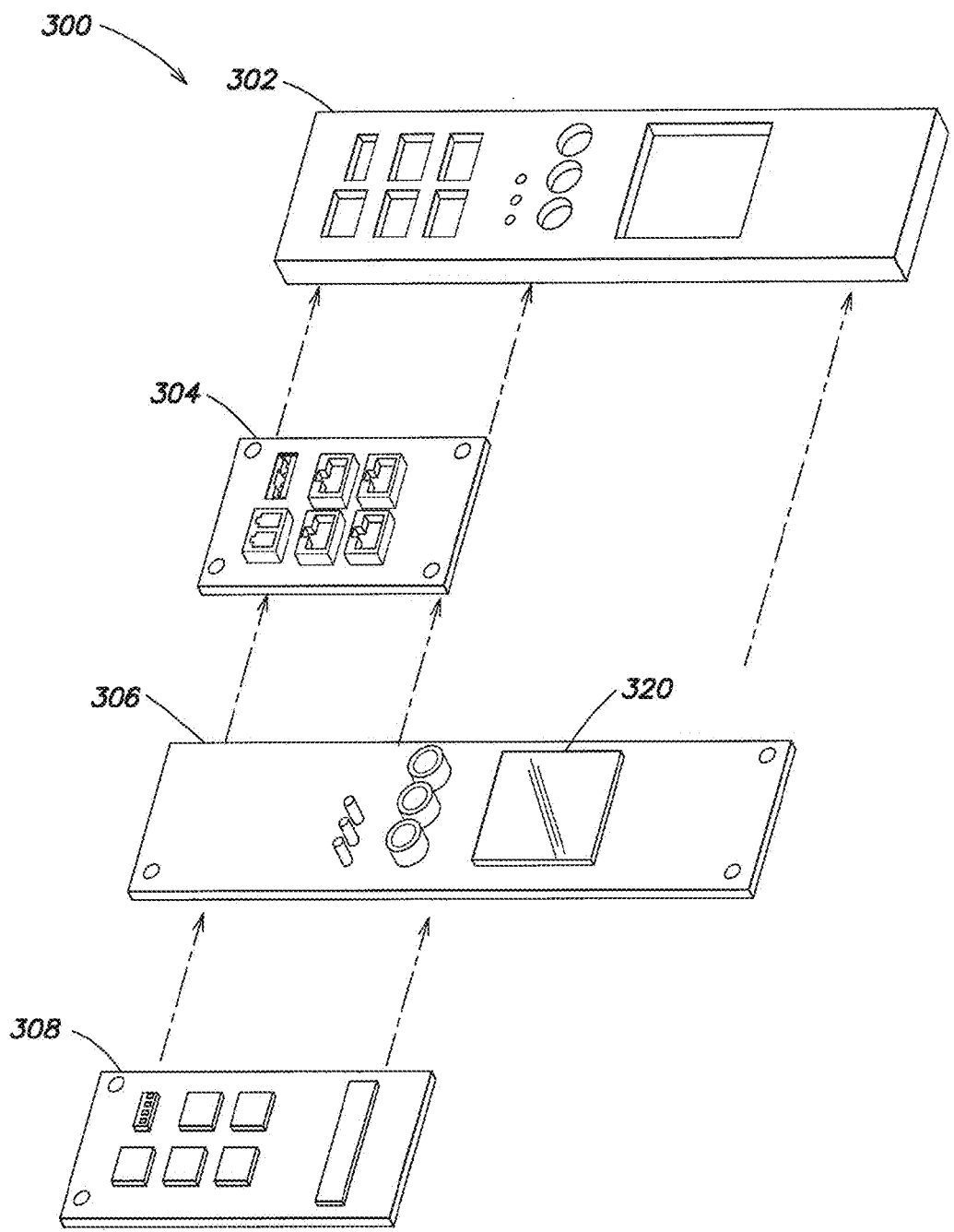
FIG. 3 is a block diagram of one embodiment of a management module, according to various aspects of the present invention.

An exploded view of the management module 160 is shown in FIG. 3. According to one embodiment, the management module 160 is constructed of modular components contained within a frame 302. The modular components include a ports module 304, a display module 306 and a communications module 308. In one example, the use of modular components allows servicing of the management module at the component level. The frame 302, is constructed to secure a plurality of components that together make up the management module. The ports module, 304, is constructed to fit securely in the frame 302, so that available ports are accessible from the face of the management module. The configuration of the installed ports can vary depending on the needs of a given installation. For example, ports that provide environmental monitoring can be provided. In some embodiments, environmental ports can detect and report on temperature, humidity among other environmental factors.

The display module 306 likewise fits into place, abutting the ports module 304 and securing to the frame 302. The communication module 308 connects to the frame 302. In some embodiments the modules are designed to connect to each other and/or the frame 302 to complete the management module.

The use of modular components allows upgrades and additional or alternative functionality to be included in the management module. For example, a wired communication device, shown in FIG. 3, (communication module 308) can be replaced with a wireless component, freeing space on the port module 304 for environmental sensors. Further, a failed display 320, may be serviced by replacing the display module 306 rather than requiring the replacement of an entire management module. Modularized components for the management module 300 permits customized management solutions for given PDUs, which can be adjusted even for specific racks, and customized for the need of the various components installed in any given rack at any given time.

Figure 5:
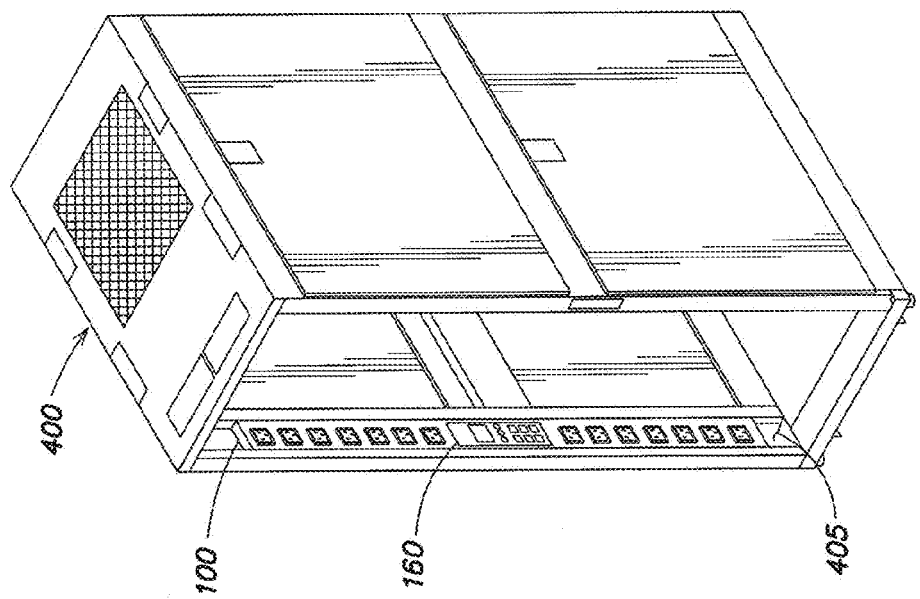
FIG. 5 illustrates the power distribution unit of FIG. 1 in a vertically installed position in the equipment rack of FIG. 4, according to various aspects of the present invention.
Figure 4:
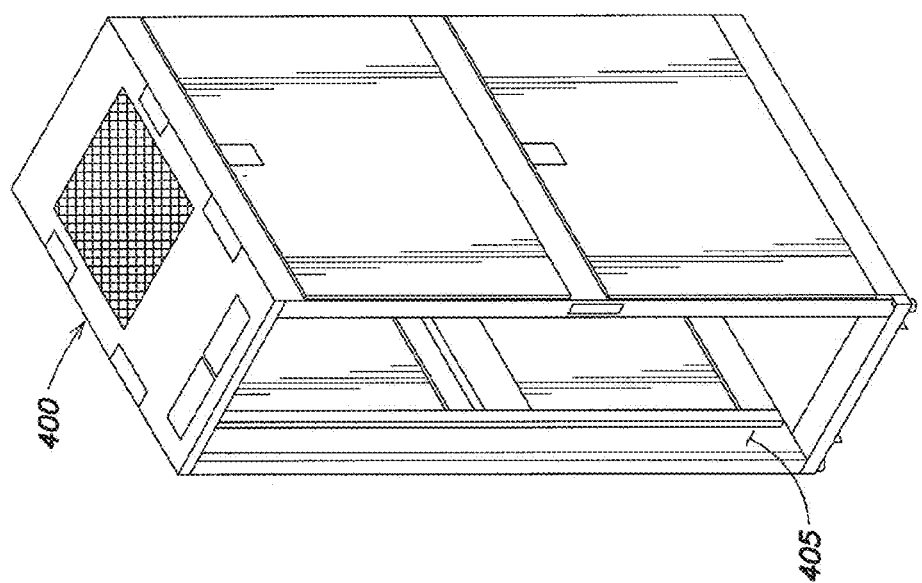
FIG. 4 is a block diagram of a conventional rack for mounting computer components, according to various aspects of the present invention.

FIG. 4 shows a 19" rack, 400, and FIG. 5 shows the PDU 100 from FIG. 1 vertically mounted in a rear corner of the rack 400. The rack 400 in one embodiment is a standard EIA-310-D standard rack, available, for example, from American Power Conversion Corporation of West Kingstong RI, under the trade name NetShelter®.

The illustration of rack 400 is provided by way of example, and is not meant to be limiting. PDU's in accordance with various embodiments may also be used with other racks, and also may be used in installations that do not use equipment racks.

As shown in FIG. 5, the advantages of low profile PDUs and removable management modules are readily apparent. The PDU 100 is shown in an installed position occupying a channel 405 (also see FIG. 4) defined by the frame of the rack 400. As shown in FIG. 5, in its installed position, the PDU 100 does not extend into the equipment mounting space in the rack. Not shown, a second channel exists on the opposite side of the rack 400, permitting installation of a second PDU. For racks without defined channels, the PDU 100 can still be installed without occupying mounting space reserved for components. Typically mounting brackets are supplied to permit installation of low profile PDUs in any standard rack enclosure.

One should readily appreciate from FIG. 5, the difficulty an operator would face in a full replacement of an installed PDU. Not shown, in FIG. 5 are the various components, servers, electronics, data processing and/or telecommunication equipment that would typically occupy the mounting space of rack 400. Each and every component would typically be connected at least once to the PDU 100. Thus a full replacement of the PDU requires that any connected devices be disconnected, and then the operator must undertake the task of replacing the PDU itself. Further, the operator would be required to connect all the devices and restore any settings needed to operate the PDU. In typical data centers, multiple racks are installed side by side, numbering in the tens or even hundreds of racks for larger installations. Permitting only the management module 160 to be removed and replaced offers significant advantage in servicing, maintaining and upgrading PDUs.

In this example, PDU 100 is constructed and arranged to have an installed position in a rack so that no mounting space is occupied by the PDU itself. Referring to FIG. 5, PDU 100 is shown installed in a vertical mounting channel. The mounting channel is recessed and permits the PDU to fit within the space defined by the channel. Other mounting positions can be used and mounting position can vary by installation and according to the dimensions of an installed PDU.

In addition, removable management modules offer unique upgrade potential. For example, a standard management module can be configured to provide monitoring capability for the load placed on its circuits. The standard management module can include communication devices that permit remote monitoring and management of the PDU. Once installed the difficulty in servicing such a PDU, limits the ability to enhance conventional low profile PDUs. For PDUs with removable management modules, newer and improved management modules can be installed. Indeed, different management modules, with different capability can be easily exchanged depending on desired functionality. In one example, a management module with enhanced environmental monitoring features can be exchanged for a standard management module. An environmental management module can include additional ports for temperature monitoring and humidity detection. In other examples, an enhanced management module can be configured with door sensors and other environmental sensor inputs. Other embodiments include control elements for remotely operating door locks on a rack. Other functionality that can be installed by replacing the management module includes replacing a management module with wired communication for a management module with a wireless communication device or devices. The wireless management module can also provide wireless communication with remote sensors installed within or in proximity to a rack.

Figure 6:
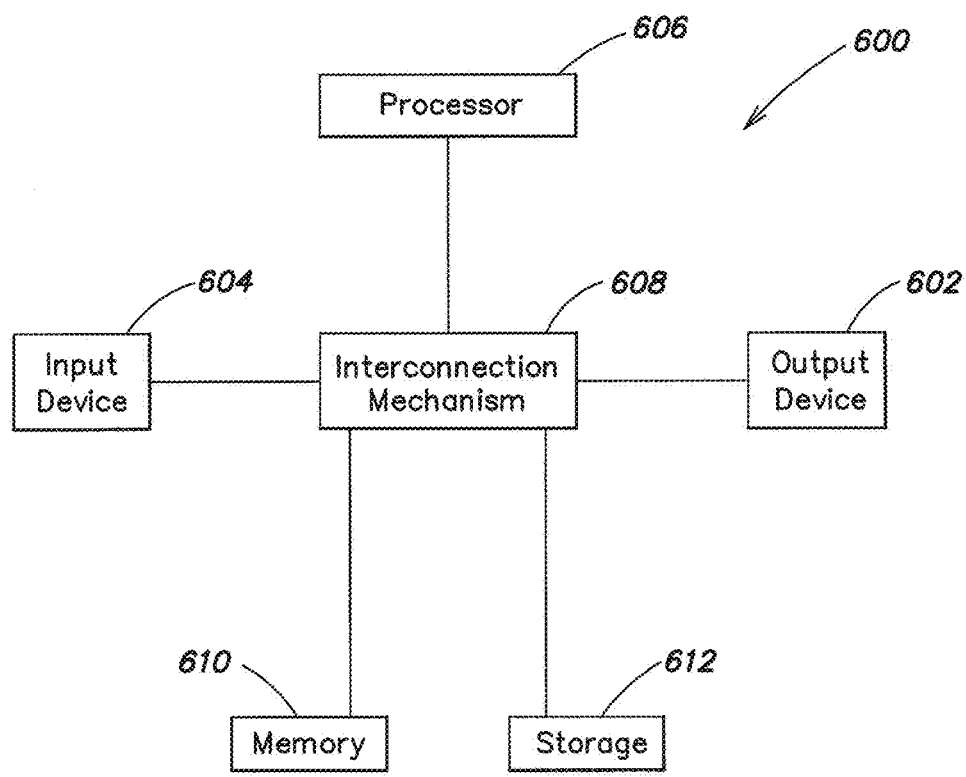
FIG. 6 is a block diagram of a general purpose computing platform implemented in a management component and associated circuitry in an example power distribution unit, according to various aspects of the present invention.

Referring to FIG. 6, illustrated is a block diagram of computing components forming a system 600 defined by the management module and internal circuitry of the PDU in accordance with one embodiment. The system 600 can define for example a general-purpose computing platform such as those based on Intel PENTIUM-type processor, Motorola PowerPC, Sun UltraSPARC, Hewlett-Packard PA-RISC processors, or any other type of processor. Further, the specialized software implementing the various functions discussed above may be located on either the management module or the motherboard assembly, or may be distributed among either.

System 600 can include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the system described above or as an independent component.

Various aspects of the invention may be implemented as specialized software executing in on system 600 such as that shown in FIG. 6. The system 600 may include a processor/ASIC 606 connected to one or more memory devices 610, such as a disk drive, memory, flash memory or other device for storing data. Memory 610 is typically used for storing programs and data during operation of the system 600. Components of computer system 600 may be coupled by an interconnection mechanism 608, which may include one or more busses (e.g., between components that are integrated within a same machine) and/or a network (e.g., between components that reside on separate discrete machines). The interconnection mechanism 608 enables communications (e.g., data, instructions) to be exchanged between components of system 600. Further, as discussed above interconnection mechanism 608 can be disconnected during servicing of a PDU. System 600 also includes one or more input devices 604, which could be for example, a keyboard, mouse, trackball, microphone, and/or a touch screen. Input devices include for example, buttons 170-174 illustrated in FIG. 1. System 600 includes one or more output devices 602, which can include for example, a printing device, display screen, and/or speaker. Output devices 602 includes display 168, illustrate in FIG. 1, as an example. In addition, computer system 600 may contain one or more interfaces (not shown) that computer system 600 to a communication network (in addition or as an alternative to the interconnection mechanism 608).

Storage system 612, typically includes a computer readable and writeable nonvolatile recording medium in which signals are stored that define a program to be executed by the processor/ASIC or information stored on or in the medium to be processed by the program. The medium may, for example, be a disk or flash memory and in some examples can include RAM. Typically, in operation, the processor/ASIC causes data to be read from the nonvolatile recording medium into another memory 610 that allows for faster access to the information by the processor/ASIC than does the medium. This memory 610 is typically a volatile, random access memory such as a dynamic random access memory (DRAM) or static memory (SRAM). It may be located in storage system 612, as shown, or in memory system 610. The processor/ASIC 606 generally manipulates the data within the integrated circuit memory 610 and then copies the data to the storage 612 after processing is completed. A variety of mechanisms are known for managing data movement between storage 612 and the integrated circuit memory element 610, and the invention is not limited thereto. The invention is not limited to a particular memory system 610 or storage system 612.

System, 600, may define a general-purpose computer platform that is programmable using a high-level computer programming language. System, 600, may be also implemented using specially programmed, special purpose hardware, e.g. ASIC 606. In system 600 there may be a processor, 606, that is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Visa or Windows 7 operating systems available from the Microsoft Corporation, MAC OS System X available from Apple Computer, the Solaris Operating System available from Sun Microsystems, or UNIX and/or LINUX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of" respectively, shall be closed or semi-closed transitional phrases, as set forth, with respect to claims, in the United States Patent Office Manual of Patent Examining Procedures (Eighth Edition 2nd Revision, May 2004), Section 2111.03.

Use of ordinal terms such as "first", "second", "third", "a", "b" "c" etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A power distribution unit comprising:
   a housing having a length, a width and a depth with a front face of the housing extending across the width and along the length with the length being substantially greater than the width and the depth, and wherein the front face of the housing defines an opening to a docking space in an interior portion of the housing;
   a plurality of power outlets disposed on the front face of the housing;
   a management module having a processor configured to detect and manage current through at least one of the plurality of power outlets, the management module being further configured and arranged to fit within the docking space;
   a memory component contained within the housing and configured to store operational data for the power distribution unit;
   wherein the management module and the housing are configured and arranged such that the management module is removable from the docking space through the opening in the front face;
   a power input and power circuitry configured to distribute input power at the power input to each of the plurality of power outlets; and
   wherein the power distribution unit is configured to operate in a maintenance mode without power management by the management module in response to the management module being decoupled from the power distribution unit.

2. The power distribution unit of claim 1, wherein the memory component is mounted in the interior portion of the housing separate from the management module.

3. The power distribution unit of claim 1, wherein the management module further comprises communication circuitry, and wherein the communications circuitry is configured to communicate with an external communications network.

4. The power distribution unit of claim 3, wherein the communications circuitry is configured for wireless communication with the external communications network.

5. The power distribution unit of claim 1, wherein the management module further comprises a display.

6. The power distribution unit of claim 1, further comprising at least one cable having a connector for electrically coupling the management module to circuitry contained with the interior portion of the housing.

7. The power distribution unit of claim 1, further comprising at least one current sensor coupled to the management module, and wherein the memory includes calibration data associated with the at least one current sensor.

8. The power distribution unit of claim 1, wherein the management module has a front face that is substantially flush with the front face of the housing with the management module installed in the docking space.

9. The power distribution unit of claim 1, wherein the management module delivers a control signal to at least one of the plurality of outlets.

10. The power distribution unit of claim 9, wherein the power circuitry is configured to provide a control signal to the at least one of the plurality of outlets in response to removal of the management module.

11. A power distribution method for providing power to a plurality of devices installed in an equipment rack, the method comprising:

installing a power distribution unit within the equipment rack, the power distribution unit including a power input; a plurality of power outlets, a memory device and a removable management module having a processor configured to monitor and manage current through at least one of the plurality of power outlets, wherein the memory device includes calibration data for use by the management module to monitor and manage the current;

coupling a power source to the power input;

coupling the plurality of power outlets to the plurality of devices to provide power to the plurality of devices;

with the power distribution unit installed within the equipment rack, removing the management module from the power distribution unit; and entering a maintenance mode of operation without power management by the management module in response to removing the management module.

12. The power distribution method of claim 11, further comprising installing a replacement management module in the power distribution unit.

13. The power distribution method of claim 12, further comprising monitoring and managing the current through the at least one of the plurality of power outlets using the replacement management module and the calibration data in the memory device.

14. The power distribution method of claim 12, wherein the replacement management module is configured to provide additional functionality.

15. The power distribution method of claim 12, further comprising managing the current through the at least one of the plurality of power outlets using the replacement management module and the calibration data in the memory device.

16. The power distribution method of claim 12, further comprising restoring system settings for the power distribution unit to the replacement management module from the memory device.

17. The power distribution method of claim 11, wherein the equipment rack has a bottom and a top, wherein the power distribution unit has a length, a width and a depth with a front face of the power distribution unit extending across the width and along the length with the length being substantially greater than the width and the depth, and wherein installing the power distribution unit in the equipment rack includes vertically mounting the power distribution unit in a rear portion of the equipment rack such that the length of the power distribution unit extends in a direction from the bottom of the equipment rack to the top of the equipment rack.

18. The power distribution method of claim 11, wherein the removable management module includes a display, and wherein the method further includes displaying information on the display related to power usage of at least one of the plurality of devices.

19. The power distribution method of claim 11, further comprising connecting the removable management module to a communications network.

20. The power distribution method of claim 11, wherein entering a maintenance mode of operation without power management by the management module includes providing control signals from power circuitry to the at least one of the plurality of outlets in the power distribution unit in response to removal of the management module.

* * * * *